United States Patent
Edynak et al.

(10) Patent No.: US 12,060,811 B2
(45) Date of Patent: Aug. 13, 2024

(54) TURBOMACHINE FAN ROTOR

(71) Applicants: SAFRAN, Paris (FR); SAFRAN AIRCRAFT ENGINES, Paris (FR)

(72) Inventors: Jeremy Philippe Pierre Edynak, Moissy-Cramayel (FR); Jeremy Guivarc'h, Moissy-Cramayel (FR); Lola Auliac, Moissy-Cramayel (FR); Thibaut Dominique Augustin Girard, Moissy-Cramayel (FR); Pierre Jean Faivre D'Arcier, Moissy-Cramayel (FR)

(73) Assignees: SAFRAN, Paris (FR); SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/441,619

(22) PCT Filed: Mar. 19, 2020

(86) PCT No.: PCT/FR2020/050600
§ 371 (c)(1),
(2) Date: Sep. 21, 2021

(87) PCT Pub. No.: WO2020/193923
PCT Pub. Date: Oct. 1, 2020

(65) Prior Publication Data
US 2022/0127965 A1 Apr. 28, 2022

(30) Foreign Application Priority Data
Mar. 28, 2019 (FR) ........................... 1903293

(51) Int. Cl.
*F01D 11/00* (2006.01)
*F01D 5/30* (2006.01)

(52) U.S. Cl.
CPC .......... *F01D 5/3007* (2013.01); *F01D 11/003* (2013.01); *F05D 2220/32* (2013.01);
(Continued)

(58) Field of Classification Search
CPC .......................... F01D 11/008; F05D 2260/37
See application file for complete search history.

(56) References Cited

U.S. PATENT DOCUMENTS 6,416,280 B1 7/2002 Forrester et al.
9,670,791 B2 * 6/2017 Broomer ............... F01D 11/005
(Continued)

FOREIGN PATENT DOCUMENTS

FR 3026794 A1 4/2016
WO 2010/007323 A1 1/2010

OTHER PUBLICATIONS

International Search Report received for PCT Patent Application No. PCT/FR2020/050600, mailed on Jul. 28, 2020, 8 pages (3 pages of English Translation and 5 pages of Original Document).

*Primary Examiner* — Christopher Verdier
*Assistant Examiner* — Arthur Paul Golik
(74) *Attorney, Agent, or Firm* — WOMBLE BOND DICKINSON (US) LLP

(57) ABSTRACT

The invention relates to a fan rotor for a turbomachine, including a fan disk, fan blades with a leading edge and a trailing edge, platforms inserted between the blades and fixed to the periphery of the disk, each including an aerodynamic surface extending from the leading edges to the trailing edges of the blades. The aerodynamic surface includes an upstream longitudinal portion on the side of the leading edges and a downstream longitudinal portion on the side of the trailing edges, the upstream longitudinal portion being supported by a first member of the platform fixed to the disk in a pivotable manner, and the downstream longi- (Continued)

tudinal portion being independent of the upstream longitudinal portion and supported by a second member of the platform which is independent of the first member and fixed to the disk in a pivotable manner.

12 Claims, 3 Drawing Sheets

(52) U.S. Cl.
CPC ...... *F05D 2230/60* (2013.01); *F05D 2240/30* (2013.01); *F05D 2240/55* (2013.01)

(56) References Cited

U.S. PATENT DOCUMENTS

| | | | |
|---|---|---|---|
| 9,739,162 B2* | 8/2017 | Bottome | F01D 11/08 |
| 11,162,418 B2* | 11/2021 | Aubert | F01D 11/008 |
| 2008/0226458 A1 | 9/2008 | Pierrot et al. | |
| 2011/0076148 A1* | 3/2011 | Fulayter | F01D 5/3015 |
| | | | 29/889 |
| 2012/0301314 A1 | 11/2012 | Alvanos et al. | |
| 2014/0186187 A1 | 7/2014 | Lamboy et al. | |
| 2015/0125305 A1 | 5/2015 | Duelm et al. | |
| 2017/0298750 A1* | 10/2017 | Jablonski | F01D 5/323 |
| 2019/0257210 A1* | 8/2019 | Li | F01D 5/282 |

* cited by examiner

TURBOMACHINE FAN ROTOR

TECHNICAL FIELD OF THE INVENTION

The present invention relates to a fan rotor for a turbomachine, advantageously but not exclusively for aircraft.

BACKGROUND

The prior art comprises in particular the documents US-A1-2014/186187, FR-A1-3 026 794, US-B1-6 416 280, WO-A1-2010/007323 and US-A1-2015/125305.

Referring to FIG. 1, which shows a partial cross-sectional view of a fan rotor 1, it is known from the prior art that a fan rotor 1 has an axis of rotation and comprises a fan casing, a fan disc 2, fan blades 3 or fan vanes comprising as a device for retaining roots press-fitted in sockets in the periphery of said disc 2. Each blade 3 comprises an intrados, an extrados, a leading edge 3a and a trailing edge 3b.

The fan rotor 1 comprises platforms 4 interposed between the fan blades 3 and fixed to the periphery of the disc 2. Each platform 4 comprises an aerodynamic surface 4a extending along said axis substantially from the leading edges 3a to the trailing edges 3b of the blades 3 between which this platform 4 is mounted.

Finally, the rotor 1 comprises an upstream cone 13, an upstream shell 14 and a downstream shell 15, the two shells 14, 15 being secured to the fan disc 2. Such a fan rotor is known in particular from the document US2008/0226458. Each platform must provide the following functions, including an aerodynamic function which is its primary function and a definition of the airflow duct. In addition, each platform must meet all the operating conditions, i.e., ensure 30) the performance for the entire operating shell, e.g., a flight for an aircraft, ensure the safety requirements, and ensure the availability of the rotor as part of the engine for a commercial use.

Finally, each platform must be integrated into the environment of the rotor by having coherent interfaces at the boundaries of the stage of the fan rotor and avoiding the disturbances at the level of the other stages of a turbomachine comprising the fan rotor.

On recent turbomachines, the displacements, in particular tangential ones, of the fan blades or vanes are increasingly important as the diameter of the fan rotor increases.

Thus, there is a clearance between the fan blades and the aerodynamic surface extending along said axis substantially from the leading edges to the trailing edges of the blades with a platform mounted between them. This clearance can exceed 8 millimeters at the trailing edge of each blade, whereas there is practically no clearance at the leading edge of each blade.

The presence of such a clearance requires the installation of a seal between each blade and the aerodynamic surface of the platform. However, the current sealing technologies do not allow a clearance of more than 8 millimeters to be bridged. The seal of the fan rotor assembly at the level of the connection of each blade to the platform is thereby degraded.

Therefore, the problem at the basis of the invention is, in a fan rotor, to ensure the sealing between a fan platform and each fan blade, in particular at the level of the interface of the platform with the trailing edge of the blade.

SUMMARY OF THE INVENTION

To this end, the present invention relates to a fan rotor for a turbomachine, this rotor having an axis of rotation and comprising:

a fan disc, fan blades comprising roots press-fitted in sockets in the periphery of said disc, each blade comprising an intrados, an extrados, a leading edge and a trailing edge, platforms interposed between the fan blades and fixed to the periphery of the disc, each platform comprising an aerodynamic surface extending along said axis substantially from the leading edges to the trailing edges of the blades between which this platform is mounted, characterized in that said aerodynamic surface comprises an upstream longitudinal portion located on the side of the leading edges of the blades and a downstream longitudinal portion, independent of the upstream longitudinal portion, located on the side of the trailing edges of the blades, the upstream longitudinal portion being supported by a first member of the platform which is fixed, preferably in a pivotable manner, to said disc and the downstream longitudinal portion being supported by a second member of the platform which is independent of said first member and which is fixed to said disc.

The technical effect achieved by the present invention is to allow a fan platform to follow the displacements, mainly tangential, of the blades associated with the platform, in particular the displacements of their trailing edge.

To this end, the present invention proposes to axially split the aerodynamic surface of each fan platform into two longitudinal portions, leaving a downstream longitudinal portion mobile, in order to allow it to follow the displacements imposed by the associated blades.

The upstream longitudinal portion of the aerodynamic surface follows the displacements of the leading edge of the fan blades associated with the platform while the downstream longitudinal portion follows the displacements of the trailing edge of the fan blades.

The upstream longitudinal portion of the aerodynamic surface following the displacements of the leading edge is effectively blocked due to the near zero displacements of the leading edge of the fan blades associated with the platform. However, more generally, the present invention could be applied to a platform associated with two fan blades whose leading edge could move.

As previously mentioned, the excessive displacements of a trailing edge of a fan blade not followed by the platform are the cause of difficulties encountered in defining the seal between the platform and the two fan blades framing it. This is precisely avoided by the implementation of the present invention with a second member fixed to the fan disc in a pivotable manner.

In order to follow the deflections of the trailing edge of the blades associated with a platform, the second member of the platform supporting the downstream longitudinal portion can be, for example, mounted on the disc with freedom of pivoting about an axis by making a pivotal connection to the fan disc. In the embodiments that will be described later, the upstream part of the platform has been designed to be fixed and secured to the disc. However, it is possible to imagine that it could also be pivoting, like the downstream part.

The implementation of a platform in two independent parts with two longitudinal portions upstream and downstream allows to use the seals usually used in the technical field but which were no longer suitable for displacements of more than 8 millimeters between the trailing edge of a fan blade and the platform.

Advantageously, the second member is fixed to the disc in a pivotable manner. Advantageously, an axial dimension of the upstream longitudinal portion, along an axis of rotation of the rotor, is between 0.5 times and 1.5 times an axial dimension of the downstream longitudinal portion.

Advantageously, the second member is fixed to the disc by a single fixing element defining a pivot axis of this downstream longitudinal portion with respect to the disc.

The second member is fixed to the disc with a pivotal freedom to follow the deflection of the trailing edge of the fan blades associated with the platform. The simplest solution is to pivot a single fixing element around a fixing axis without the need for expensive, numerous and bulky means.

Advantageously, the second member comprises a fixing bracket axially applied to a flange of the disc, the fixing bracket comprising an axial orifice aligned with an axial orifice of the flange, said fixing element passing through the axial orifices of the fixing bracket and of the flange.

Advantageously, the orifice of the fixing bracket at least partially receives a ring through which said fixing element passes, this ring being clamped axially against the flange of the disc and separated by axial and radial clearances from said fixing bracket.

The fixing bracket forming the second member is therefore mounted with axial and radial clearances on the ring which is clamped against the disc. The diameter of the orifice in the fixing bracket is larger than the diameter of the fixing element so that a portion of the ring is inserted between the fixing bracket and the fixing element.

As a result, with the ring partially interposed between the fixing bracket and the fixing element, the fixing bracket can pivot about the fixing element passing through it while being held in position relative to the fixing element.

A portion of the ring within the fixing bracket prevents a radial movement of the fixing bracket relative to the fixing element and a portion of the ring external to the fixing bracket abuts against an axial movement of the fixing bracket relative to the fixing element.

Advantageously, the fixing element is a screw, a head of which rests on a face of the flange or of an insert on this face, and a threaded rod receives a nut which rests on said ring.

Advantageously, one of the longitudinal portions comprises, at its longitudinal end located on the side of the other of the longitudinal portions, a bearing surface for the other longitudinal portion.

The platform according to the present invention is not monobloc by comprising upstream and downstream longitudinal portions independent of each other. Alternatively, a first longitudinal portion of both the upstream and downstream longitudinal portions may comprise a bearing surface projecting from the first portion for loosely and partially supporting an end facing the second longitudinal portion.

Advantageously, the longitudinal portions comprise circumferential edges facing each other, said bearing surface extending along one of these edges, over only part of the circumferential extent of this edge.

The invention concerns an aircraft turbomachine comprising such a rotor.

BRIEF DESCRIPTION OF FIGURES

Other characteristics, purposes and advantages of the present invention will become apparent from the following detailed description and from the attached drawings, which are given as non-limiting examples and in which.

Figure 1:
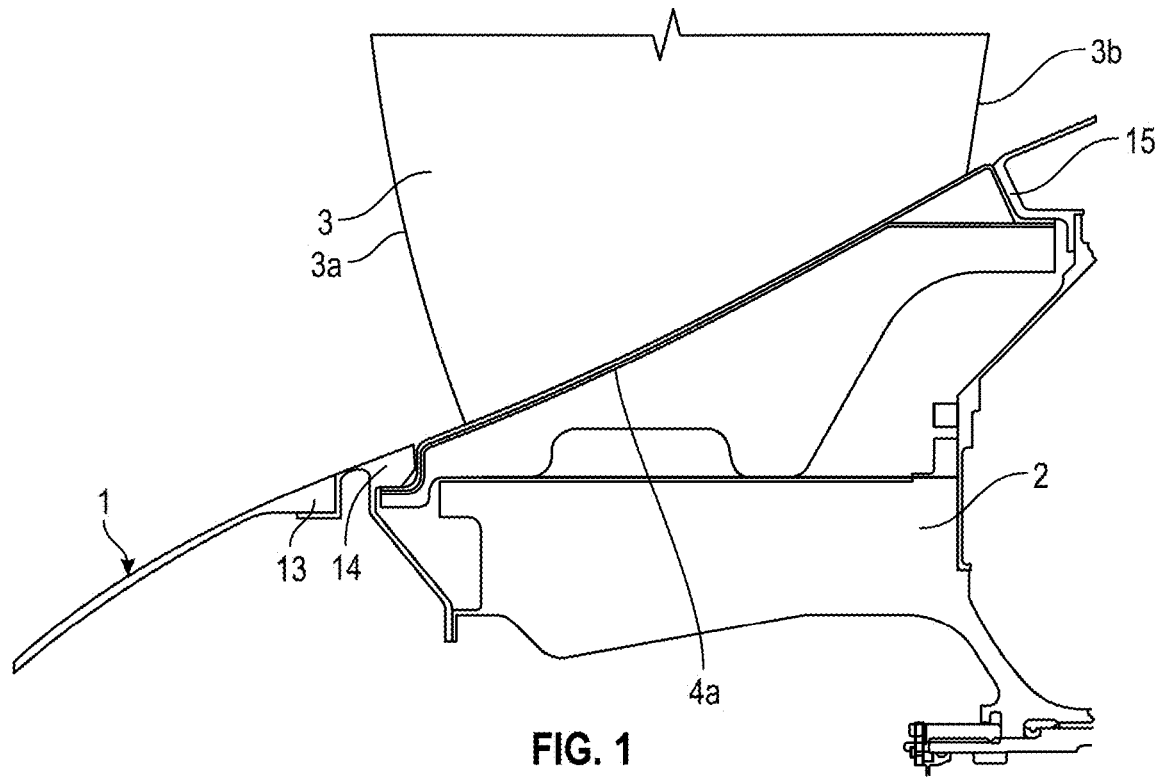
FIG. 1 is a schematic representation of a partial cross-sectional view of a fan rotor according to the prior art.

It should be kept in mind that the FIGURES are given as examples and are not limiting of the invention. They are schematic representations of principle 20) intended to facilitate the understanding of the invention and are not necessarily on the scale of practical applications. In particular, the dimensions of the various elements illustrated are not representative of reality. For example, in FIGS. 2 to 4, only one fan blade is shown, the other blades having been removed for a better view of the first and second members of the longitudinal portions of the aerodynamic surface.

DETAILED DESCRIPTION OF THE INVENTION

In the following, reference is made to all FIGURES taken in combination. Where reference is made to a specific FIGURE or FIGURES, these FIGURES are to be taken in combination with the other FIGURES for the recognition of the designated numerical references.

Referring mainly to FIGS. 2 to 6, the present invention relates to a fan rotor 1 advantageously intended for an aircraft turbomachine.

Such a rotor 1 is mounted so as to rotate about an axis of rotation and comprises a fan disc 2 and fan blades 3 comprising roots press-fitted in sockets in the periphery of said disc 2, of which only one blade 3 is visible. Each blade 3 comprises an intrados, an extrados, a leading edge 3a and a trailing edge 3b.

A periphery of the disc 2 is advantageously toothed by being provided with teeth 16, advantageously of trapezoidal section and extending axially on the disc 2 with respect to the axis of rotation of the rotor 1. At least one wedge 17 is provided on the upstream side between two adjacent teeth 16 which form a socket for receiving a root of a blade 3, this wedge 17 being intended to axially block the blade root in its corresponding socket.

Platforms 4 are interposed between the fan blades 3 and fixed to the periphery of the disc 2. Each platform 4 can therefore be interposed between two consecutive fan blades 3.

Figure 2:
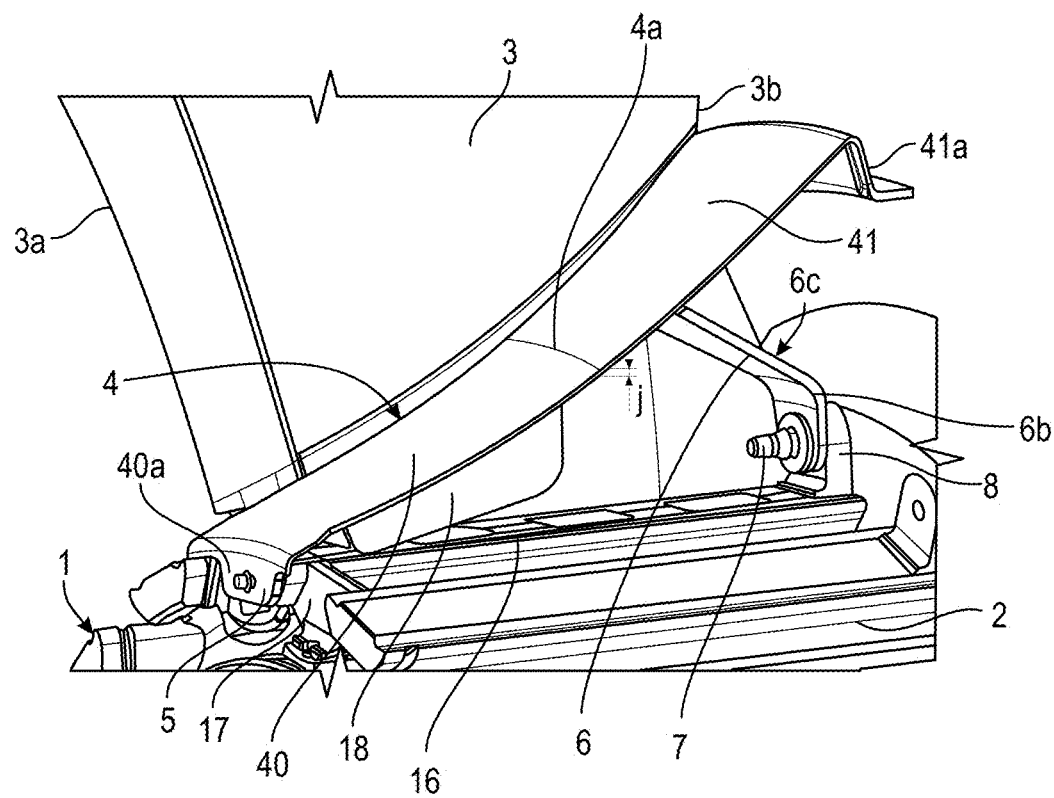
FIG. 2 is a schematic representation of a partial perspective view of a fan rotor according to an embodiment in accordance with the present invention, this FIGURE showing portions of a blade and a disc of fan and a platform with an aerodynamic surface comprising upstream and downstream longitudinal portions and their fixing members to a tooth of the fan disc, the longitudinal portions being shown in the mounted position in this FIG. 2.

Each platform 4 comprises an aerodynamic surface, referenced 4a in FIG. 2, extending along said axis substantially from the leading edges 3a to the trailing edges 3b of the two blades 3 between which this platform 4 is mounted. According to the present invention, the aerodynamic surface 4a comprises an upstream longitudinal portion 40 located on the side of the leading edges 3a of the blades 3 and a downstream longitudinal portion 41 located on the side of the trailing edges 3b of the blades 3.

The upstream longitudinal portion 40 of the aerodynamic surface 4a is supported by a first member 5 of the platform 4 which is fixed in a pivotable manner to the fan disc 2. The downstream longitudinal portion 41 of the aerodynamic surface 4a is supported by a second member 6 of the platform 4. This second member 6 is independent of the first member 5 and is fixed in a pivotable manner to the fan disc 2.

The second member 6 allows the downstream longitudinal portion 41 to follow the displacements of the trailing edge 3b of the two associated fan blades 3. In operation, the downstream longitudinal portion 41 of the aerodynamic surface 4a can perform a movement of rotation about its pivotal connection with the fan disc 2.

The main difficulty in implementing the present invention is to manage a radial clearance, shown as j in FIG. 2, between the upstream longitudinal portion 40 and the downstream longitudinal portion 41. This clearance must be neither too small to allow the two portions to rotate between each other, nor too large to ensure that the portions are centered with respect to each other.

In addition, the rotation of the downstream longitudinal portion 41 with respect to the upstream longitudinal portion 40 results in the creation of a potential step in the duct of the aerodynamic surface 4a.

Furthermore, it is also important to implement a seal technology capable, on the one hand, of managing the interface between the two longitudinal portions 40, 41 and, on the other hand, a seal capable of compensating the clearance necessary for the rotation of the downstream longitudinal portion 41 and the downstream shell referenced 15 in FIG. 1. The seal can be an O-ring, a split seal or an Omega seal, etc.

Figure 5:
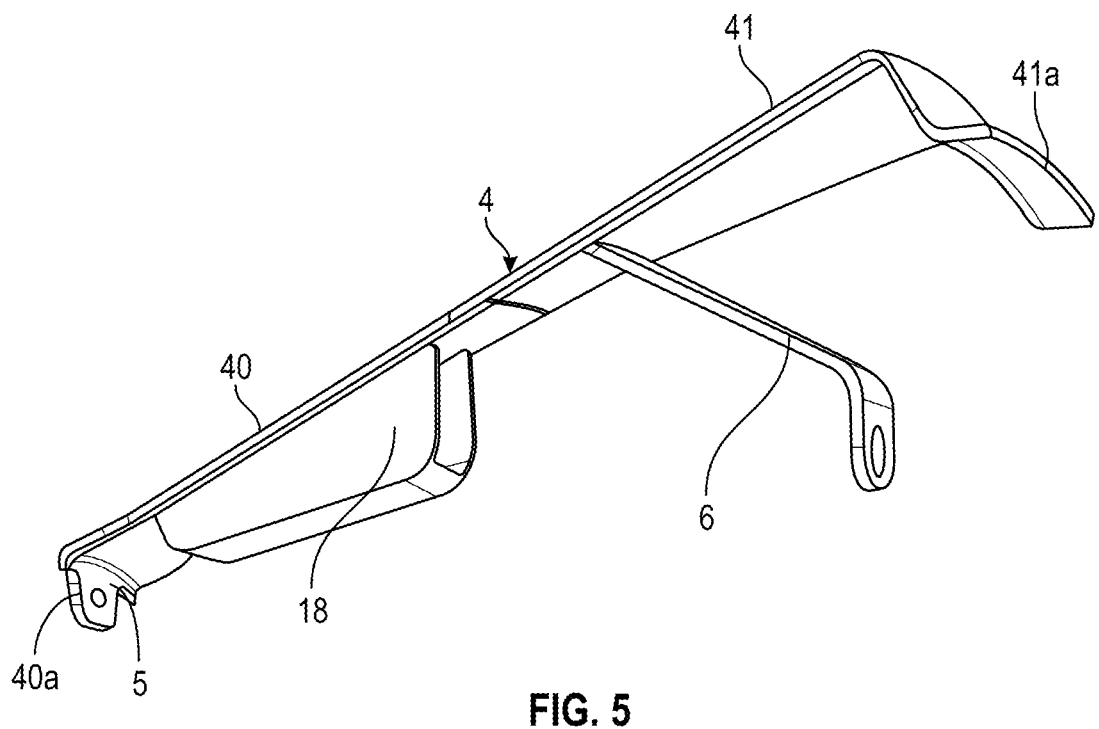
FIG. 5 is a schematic representation of a perspective view of a platform forming part of a fan rotor according to the invention previously shown in FIGS. 2 to 4.

Referring to FIG. 5, the platform 4 may also comprise a housing 18 on one of its longitudinal sides supporting the first and second members 5, 6, the housing 18 may be arranged between the first and second members 5, 6. The downstream longitudinal portion 41 may have a free end 41a bent toward the fan disc 2, said free end 41a abutting against a piece not shown in FIGS. 20) 2 to 5 but shown in FIG. 1 as a downstream shell 15 secured by a leg to the fan disc 2.

The aerodynamic surface 4a may be slightly concave on its side facing the two fan blades 3 framing it and curved in its width.

Without being limiting, an axial dimension of the upstream longitudinal portion 40 may be between 0.5 times and 1.5 times an axial dimension of the downstream longitudinal portion 41. It follows that the axial dimension of the upstream longitudinal portion 40 may be smaller than, equal to, or larger than the axial dimension of the downstream longitudinal portion 41.

The first member 5 may be supported by a bent end 40a of the upstream 30) longitudinal portion 40. The bent end 40a of the upstream longitudinal portion 40 may be secured to the fan disc 2 by a securing element, thus forming the first member 5, preferably one of the teeth 16 arranged at the circumference of the fan disc 2. The bent end 40a of the upstream longitudinal portion is preferably secured to a longitudinal end of the tooth 16 by the rim of the tooth 16 forming its thickness.

The second member 6 may be fixed to the fan disc 2 by a single fixing element 7 defining a pivot axis of this downstream longitudinal portion 41 relative to the disc 2.

A width of the downstream longitudinal portion 41 may be increased by approaching the free end of the downstream longitudinal portion 41 advantageously supporting the bent edge. This depends on whether the distance between two consecutive fan blades 3 remains constant or not.

Figure 6:
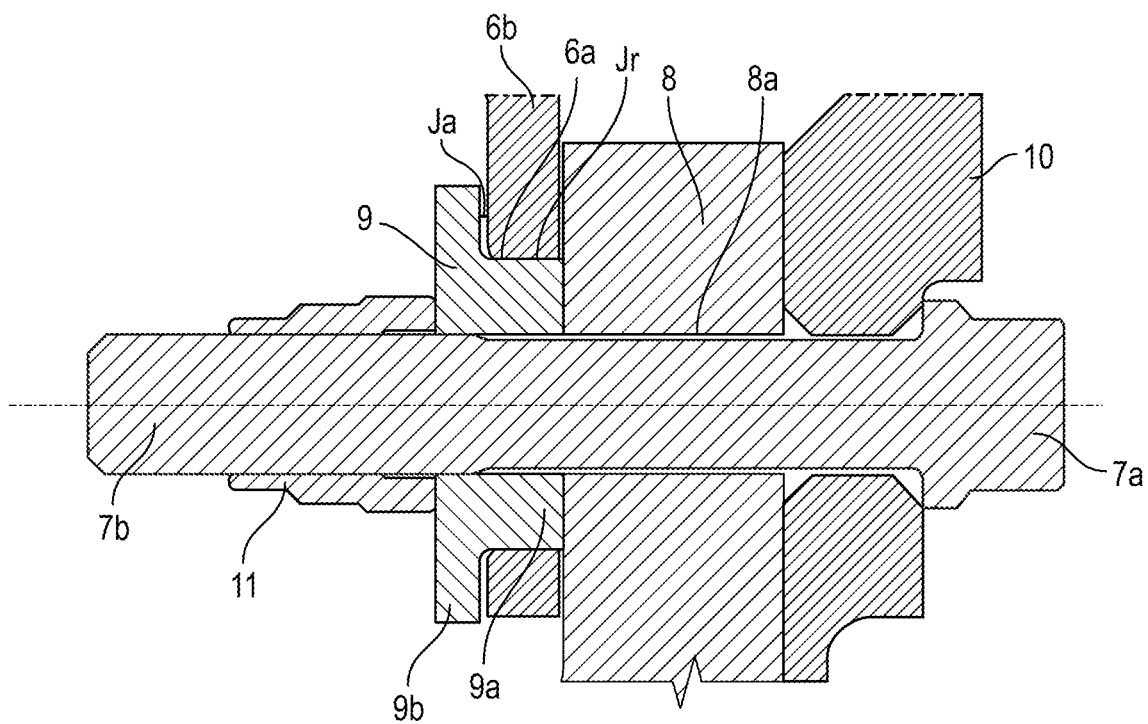
FIG. 6 is a schematic representation of a cross-sectional view of the second member of the downstream longitudinal portion of the aerodynamic surface of the platform forming part of a fan rotor according to an embodiment of the present invention, the second member being connected to a tooth of a fan disc of the rotor by means of a flange.

Still referring mainly to FIGS. 2 and 6 and more particularly to FIG. 6, the second member 6 associated with the downstream longitudinal portion 41 may comprise a fixing bracket 6c axially applied to a flange 8 of the fan disc 2. The flange 8 may extend from a tooth 16 on the periphery of the fan disc 2, at a longitudinal end of the tooth 16 furthest from the first member 5. The flange 8 may be supported by a face of the tooth 16 opposite an inner face of the aerodynamic surface 4a supporting the first and second members 5, 6, advantageously extending perpendicularly to the face of the tooth 16 supporting it.

The fixing bracket 6c may be elongated, with the downstream longitudinal 20) portion 41 extending away from the disc 2. The fixing bracket 6c may have a bent end part 6b with an orifice 6a therethrough.

This orifice 6a of the fixing bracket 6c is an axial orifice aligned with an axial orifice 8a of the flange 8 in the fixing position of the second member 6. The bent end part 6b of the fixing bracket 6c then rests against the flange 8 of the fan disc 2.

As particularly well visible in FIG. 6, the fixing element 7 passes through the axial orifice 6a of the bent end part 6b of the fixing bracket 6c and the axial orifice 8a of the flange 8.

In order to allow a freedom of rotation of the bent end part 6b of the fixing bracket 6c of the second member 6 with respect to the fixing element 7, the orifice 6a of the bent end part 6b of the fixing bracket 6c may at least partially receive a ring 9 through which the fixing element 7 passes. Thus, there may be an inner portion 9a of the ring 9 housed in the orifice 6a of the bent end part 6b of the fixing bracket 6c, the inner portion 9a of the ring 9 being interposed between an inner wall of the orifice 6a and an outer wall of the fixing element 7. The remainder of the ring 9 is an outer portion disposed outside the bent end part 6b and capable of forming a collar 9b capable of abutting against an axial displacement of the bent end part 6b of the fixing bracket 6c.

The ring 9 can be clamped axially against the flange 8 of the disc 2, thus ensuring a secure fixing, but still separated by axial clearances Ja and radial clearances Jr from the bent end part 6b of the fixing bracket 6c. Thus, the bent end part 6b of the fixing bracket 6c can pivot about the fixing element 7 due to the axial clearance Ja and radial clearance Jr with the ring 9.

The radial clearance Jr may thus be limited by the portion of the ring 9 internal to the bent end part 6b and the axial clearance Ja may be limited by the portion of the ring 9 external to the bent end part 6b, advantageously in the form of a collar 9b abutting against a removal of the flange 8 in the axial direction of the bent end part 6b of the fixing bracket 6c.

Still referring mainly to FIG. 6, the fixing element 7 may be a screw having a head 7a and a threaded rod 7b.

The head 7a of the screw may be supported on a face of the flange 8 opposite that facing the ring 9 or of an insert 10 on this face, the latter alternative being shown in FIG. 6, the insert 10 being for example a washer, or as here, a piece forming part of a low-pressure compressor drum of the turbomachine. It is also possible to replace the head 7a with a nut.

At its other free end, the threaded rod 7b can also receive a nut 11 which rests on the ring 9 and clamps it against the flange 8 by means of its inner portion 9a at the bent end part 6b of the fixing bracket 6c.

Figure 3:
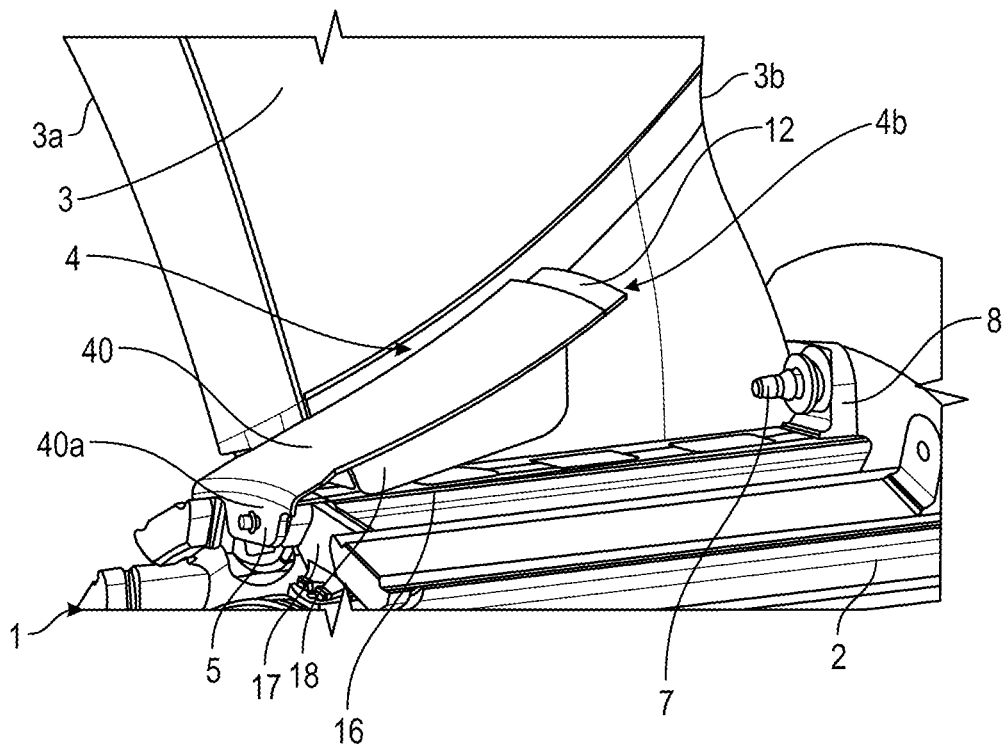
FIG. 3 is a schematic representation of a perspective view of the fan rotor shown in FIG. 2, with only the upstream longitudinal portion of the aerodynamic surface shown in this FIG. 3.

Referring more particularly to FIG. 3 which shows an upstream longitudinal portion 40 without the presence of a downstream longitudinal portion 41, one 40 of the longitudinal portions 40, 41, in FIG. 3 the upstream longitudinal portion 40 which is not limiting, may comprise, at its longitudinal end located on the side of the other 41 of the longitudinal portions 40, 41, in FIG. 3 the downstream longitudinal portion 41, a bearing surface 12 for this other longitudinal portion 41.

This allows to avoid a mismatch between upstream and downstream longitudinal portions 40, 41 and to have a support of the downstream longitudinal portion 41 by the upstream longitudinal portion 40 at one end of the downstream longitudinal portion 41 at a distance from the second member 6.

Figure 4:
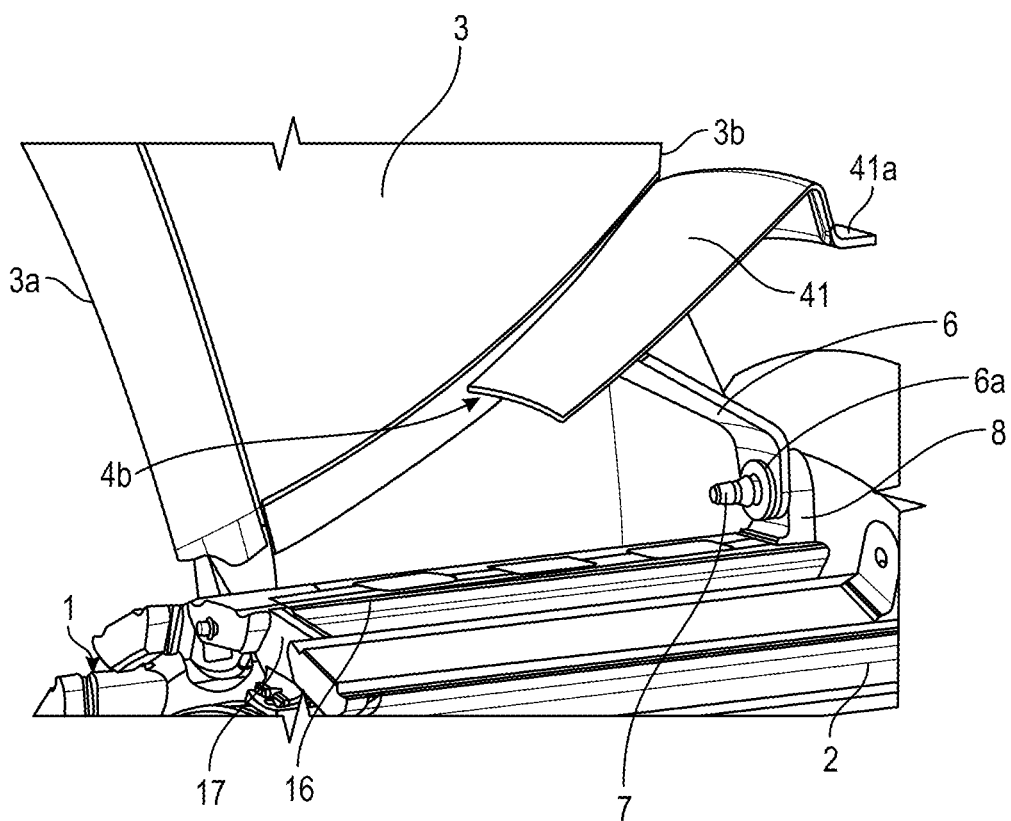
FIG. 4 is a schematic representation of a perspective view of the fan rotor shown in FIG. 2, with only the downstream longitudinal portion of the aerodynamic surface shown in this FIG. 4.

As particularly well visible in FIGS. 3 and 4 taken in combination, the longitudinal portions 40, 41 of the aerodynamic surface 4a may comprise circumferential edges 4b facing each other. The bearing surface 12 may extend along one of these edges, over only a part of the circumferential extent of that edge.

This part of the bearing surface 12 may be arranged symmetrically with respect to the circumferential edge 4b bearing it with only end portions of the circumferential edge 4b bearing the bearing surface 12 not being connected to the bearing surface 12. Alternatively, the bearing surface 12 may be supported by a major part of the circumferential edge.

A particularly advantageous application of such a fan rotor 1 may be for a turbomachine, advantageously an aircraft turbomachine.

The invention is by no means limited to the described and illustrated embodiments which have been given only as examples.

The invention claimed is:

1. A fan rotor for a turbomachine, the rotor having an axis of rotation and comprising:
    a fan disc,
    fan blades comprising roots press-fitted in sockets in a periphery of said disc, each blade comprising an intrados, an extrados, a leading edge and a trailing edge,
    platforms interposed between the fan blades and fixed to the periphery of the disc, each platform comprising an aerodynamic surface extending along said axis substantially from the leading edges to the trailing edges of the blades between which the each platform is mounted,
    wherein said aerodynamic surface comprises an upstream longitudinal portion located on a side of the leading edges of the blades and a downstream longitudinal portion, independent of the upstream longitudinal portion, located on a side of the trailing edges of the blades, the upstream longitudinal portion being supported by a first member of the each platform which is fixed to said disc and the downstream longitudinal portion being supported by a second member of the each platform which is independent of said first member and which is fixed to said disc, and
    wherein a radial clearance, allowing the downstream longitudinal portion and the upstream longitudinal portion to rotate between each other, exists between the two portions.

2. The rotor according to claim 1, wherein the second member is fixed to the disc in a pivotable manner.

3. The rotor according to claim 1, wherein an axial dimension of the upstream longitudinal portion, along the axis of rotation of the rotor, is between 0.5 times and 1.5 times an axial dimension of the downstream longitudinal portion.

4. The rotor according to claim 1, wherein the second member is fixed to the disc by a single fixing element defining a pivot axis of the downstream longitudinal portion with respect to the disc.

5. The rotor according to claim 4, wherein the second member comprises a fixing bracket axially applied to a flange of the disc, the fixing bracket comprising an axial orifice aligned with an axial orifice of the flange, said fixing element passing through the axial orifices of the fixing bracket and of the flange.

6. The rotor according to claim 5, in which the orifice of the fixing bracket at least partially receives a ring through which said fixing element passes, the ring being clamped and separated by axial (Ja) and radial (Jr) clearances from said fixing bracket.

7. The rotor according to claim 6, wherein the fixing element is a screw, a head of which rests on a face of the flange or of an insert on the face, and a threaded rod receives a nut which rests on said ring.

8. The rotor according to claim 5, wherein the flange extends from a tooth on the periphery of the fan disc, at a longitudinal end of the tooth, which is furthest from the first member.

9. The rotor according to claim 1, wherein one of the longitudinal portions comprises, at its longitudinal end located on a side of the other of the longitudinal portions, a bearing surface for the other of the longitudinal portions.

10. The rotor according to claim 9, wherein the one of the longitudinal portions and the other of the longitudinal portions comprise circumferential edges facing each other, said bearing surface extending along one of the circumferential edges over only one part of the circumferential extent of the one of the circumferential edges.

11. The rotor according to claim 9, wherein the bearing surface of the one of the longitudinal portions is partially supporting an end of the other of the longitudinal portions.

12. An aircraft turbomachine, comprising the fan rotor according to claim 1.

* * * * *